United States Patent
Kao et al.

(10) Patent No.: US 8,666,453 B2
(45) Date of Patent: Mar. 4, 2014

(54) METHOD OF ADJUSTING EVENT PROMPT DEGREE, AND MOBILE ELECTRONIC DEVICE AND COMPUTER PROGRAM PRODUCT USING THE SAME

(75) Inventors: Yih-Feng Kao, Taoyuan County (TW); Hui-Wen Wang, Taoyuan County (TW)

(73) Assignee: HTC Corporation, Taoyuan County (TW)

(*) Notice: Subject to any disclaimer, the term of this patent is extended or adjusted under 35 U.S.C. 154(b) by 334 days.

(21) Appl. No.: 12/861,821

(22) Filed: Aug. 23, 2010

(65) Prior Publication Data

US 2011/0053581 A1     Mar. 3, 2011

(30) Foreign Application Priority Data

Sep. 3, 2009    (TW) ................ 98129724 A (51) Int. Cl.
*H04M 1/00* (2006.01)
*H04M 3/00* (2006.01)
*G06F 3/041* (2006.01)

(52) U.S. Cl.
USPC .................... 455/566; 455/420; 345/173

(58) Field of Classification Search
USPC .................................................. 455/566
See application file for complete search history.

(56) References Cited

U.S. PATENT DOCUMENTS

| 2006/0019649 A1* | 1/2006 | Feinleib et al. ............... 455/420 |
| 2006/0097991 A1* | 5/2006 | Hotelling et al. ............. 345/173 |
| 2008/0162996 A1 | 7/2008 | Krah et al. |
| 2009/0066663 A1 | 3/2009 | Chang et al. |
| 2011/0040962 A1* | 2/2011 | Peyre ............................ 713/100 |

FOREIGN PATENT DOCUMENTS

| CN | 1707533 A | 12/2005 |
| CN | 101018241 A | 8/2007 |
| CN | 101384028 A | 3/2009 |
| CN | 101471995 A | 7/2009 |
| CN | 101471996 | 7/2009 |
| EP | 1600907 | 11/2005 |
| EP | 1686776 | 8/2006 |
| WO | 00/57616 | * 4/2000 |

OTHER PUBLICATIONS

"Search Report of Europe Counterpart Application", issued on Dec. 3, 2010, p. 1-p. 5.
"Office Action of Europe Counterpart Application", issued on Dec. 1, 2011, p. 1-p. 5.
"First Office Action of China Counterpart Application", issued on Aug. 15, 2012, p. 1-p. 13.
"Second Office Action of China Counterpart Application", issued on Mar. 19, 2013, p. 1-p. 12.
"Office Action of Taiwan counterpart application" issued on Dec. 24, 2012, p. 1-p. 7.

* cited by examiner

*Primary Examiner* — Charles Appiah
*Assistant Examiner* — Natasha Cosme
(74) *Attorney, Agent, or Firm* — Jianq Chyun IP Office (57) ABSTRACT

A method of adjusting an event prompt degree and a mobile electronic device and a computer program product using the same are provided. In the present method, whether at least two detection regions of the mobile electronic device simultaneously detect a touch when the mobile electronic device executes a vibration prompt corresponding to an event is determined, wherein the detection regions are independent of each other. A vibration intensity of the vibration prompt is reduced when the detection regions simultaneously detect the touch. Thereby, continuous vibration prompt is prevented from bothering other people.

12 Claims, 8 Drawing Sheets

METHOD OF ADJUSTING EVENT PROMPT DEGREE, AND MOBILE ELECTRONIC DEVICE AND COMPUTER PROGRAM PRODUCT USING THE SAME

CROSS-REFERENCE TO RELATED APPLICATION

This application claims the priority benefit of Taiwan application serial no. 98129724, filed on Sep. 3, 2009. The entirety of the above-mentioned patent application is hereby incorporated by reference herein and made a part of this specification.

BACKGROUND OF THE APPLICATION

1. Field of the Application

The present application generally relates to applications of a mobile electronic device, and more particularly, to a method of adjusting an event prompt degree of a mobile electronic device and a computer program product.

2. Description of Related Art

Mobile electronic devices, such as cell phones, have been broadly used in our daily life along with the advancement of the mobile communication technology. Besides being used for making phone calls, an existing mobile electronic device is further integrated with many other functions, such as the functions of sending/receiving short messages and/or emails and setting alarm reminders and/or calendar reminders. When a mobile electronic device receives an incoming call, a short message, an email, an alarm reminder, a calendar reminder, or any other event, the mobile electronic device prompts its user through a ringtone or vibration. However, it may be a nuisance to other people if a user's cell phone keeps ringing or vibrating when the user is attending a conference or in a quiet environment.

SUMMARY OF THE APPLICATION

Accordingly, the present application is directed to a method of adjusting an event prompt degree and a mobile electronic device and a computer program product using the same, wherein the event prompt degree of the mobile electronic device is automatically and timely adjusted.

The present application provides a method of adjusting an event prompt degree adaptable to a mobile electronic device. In the present method, when the mobile electronic device executes a vibration prompt corresponding to an event, whether at least two detection regions of the mobile electronic device simultaneously detect a touch is determined, wherein the two detection regions are independent of each other. When the detection regions simultaneously detect a touch, the vibration intensity of the vibration prompt is reduced.

The present application provides a computer program product including a plurality of program instructions, wherein the program instructions are suitable for being loaded into a mobile electronic device, and the method of adjusting the event prompt degree described above is executed after the program instructions are loaded into the mobile electronic device.

The present application provides a mobile electronic device including a processing unit and at least two sensors. Each of the sensors is corresponding to a detection region of the mobile electronic device, and the detection regions respectively corresponding to the sensors are independent of each other. The processing unit is coupled to the sensors. When the mobile electronic device executes a vibration prompt corresponding to an event, the processing unit determines whether the sensors simultaneously detect a touch. When the sensors simultaneously detect the touch, the processing unit reduces the vibration intensity of the vibration prompt.

The present application provides a mobile electronic device including a determination means and an adjustment means. The determination means is for determining whether at least two detection regions of the mobile electronic device simultaneously detect a touch when the mobile electronic device executes a vibration prompt corresponding to an event, wherein the detection regions are independent of each other. The adjustment means is for reducing the vibration intensity of the vibration prompt when the detection regions simultaneously detect the touch.

The present application provides a method of adjusting an event prompt degree adaptable to a mobile electronic device. In the present method, when the mobile electronic device executes a vibration prompt corresponding to an event, whether the mobile electronic device is moved is determined. When the mobile electronic device is moved, the vibration intensity of the vibration prompt is reduced.

The present application provides a computer program product including a plurality of program instructions, wherein the program instructions are suitable for being loaded into a mobile electronic device, and the method of adjusting the event prompt degree described above is executed after the program instructions are loaded into the mobile electronic device.

The present application provides a mobile electronic device including a sensor and a processing unit, wherein the sensor and the processing unit are coupled with each other. When the mobile electronic device executes a vibration prompt corresponding to an event, the processing unit determines whether the mobile electronic device is moved according to the sensor. When the mobile electronic device is moved, the processing unit reduces the vibration intensity of the vibration prompt.

The present application provides a mobile electronic device including a determination means and an adjustment means. The determination means is for determining whether the mobile electronic device is moved when the mobile electronic device executes a vibration prompt corresponding to an event. The adjustment means is for reducing the vibration intensity of the vibration prompt when the mobile electronic device is moved.

The present application provides a method of adjusting an event prompt degree adaptable to a mobile electronic device. In the present method, when the mobile electronic device executes a ringtone prompt corresponding to an event, whether the mobile electronic device is picked up is determined. When the mobile electronic device is picked up, the volume of the ringtone prompt is lowered.

The present application provides a computer program product including a plurality of program instructions, wherein the program instructions are suitable for being loaded into a mobile electronic device, and the method of adjusting the event prompt degree described above is executed after the program instructions are loaded into the mobile electronic device.

The present application provides a mobile electronic device including a sensor and a processing unit, wherein the sensor and the processing unit are connected with each other. When the mobile electronic device executes a ringtone prompt corresponding to an event, the processing unit determines whether the mobile electronic device is picked up according to the sensor. When the mobile electronic device is picked up, the processing unit lowers the volume of the ringtone prompt.

The present application provides a mobile electronic device including a determination means and an adjustment means. The determination means is for determining whether the mobile electronic device is picked up when the mobile electronic device executes a ringtone prompt corresponding to an event. The adjustment means is for lowering the volume of the ringtone prompt when the mobile electronic device is picked up.

As described above, in the present application, when a mobile electronic device receives an event and accordingly executes a corresponding prompt, the degree of the prompt is automatically reduced when a user touches or moves the mobile electronic device, so that continuous event prompt is prevented from bothering other people.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DESCRIPTION OF THE EMBODIMENTS

Reference will now be made in detail to the present preferred embodiments of the application, examples of which are illustrated in the accompanying drawings. Wherever possible, the same reference numbers are used in the drawings and the description to refer to the same or like parts.

Generally speaking, once a user notices an event prompt issued by a mobile electronic device, the user does not want the mobile electronic device to execute the event prompt continuously. The present application provides a method of adjusting an event prompt degree and a mobile electronic device and a computer program product using the same based on this fact. Below, embodiments of the present application will described with reference to accompanying drawings.

Figure 1:
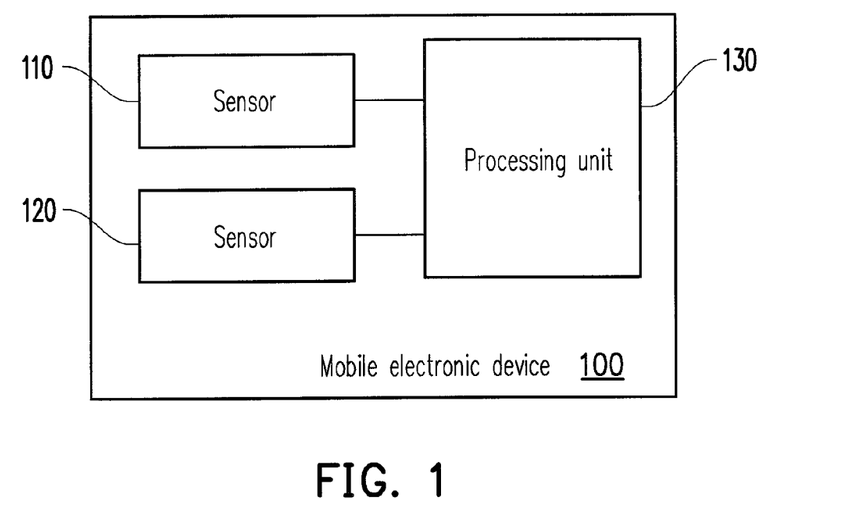
FIG. 1 is a block diagram of a mobile electronic device according to an embodiment of the present application.
Figure 2:
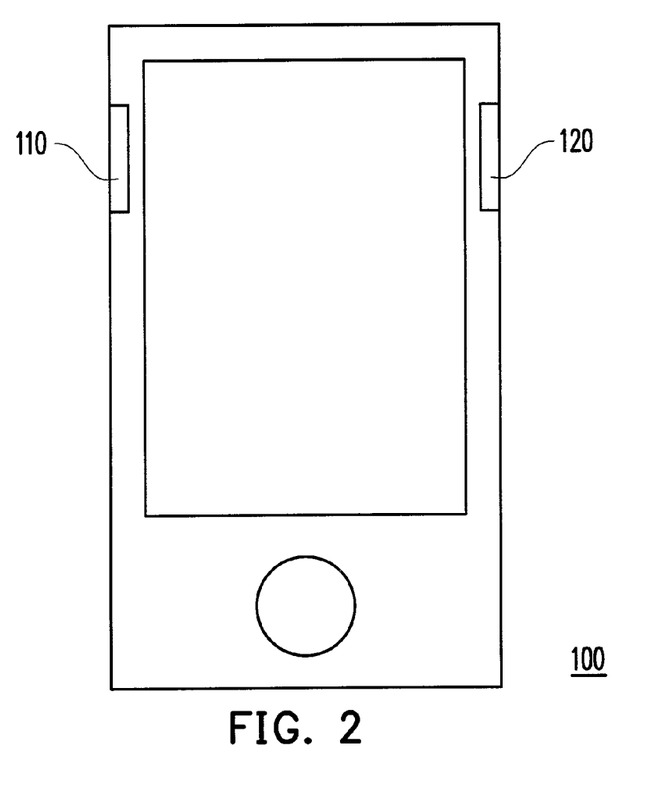
FIG. 2 is a diagram illustrating the appearance of a mobile electronic device according to an embodiment of the present application.

FIG. 1 is a block diagram of a mobile electronic device according to an embodiment of the present application. As shown in FIG. 1, the mobile electronic device 100 includes two sensors 110 and 120 and a processing unit 130. Herein the mobile electronic device 100 may be a cell phone, a personal digital assistant (PDA), a PDA phone, a smart phone, a digital camera, a music player, a game device, or any other mobile electronic device which offers an event prompt function and has two (or more) sensors. For the convenience of description, in the present embodiment, the mobile electronic device 100 is assumed to have two sensors 110 and 120. The sensor 110 and the sensor 120 may be capacitive sensors, pressure sensors (for example, resistive sensors), temperature sensors, optical sensors, or other sensors that can detect a touch. The sensors 110 and 120 are respectively corresponding to a detection region of the mobile electronic device 100, wherein the two detection regions are independent of each other. For example, the detection regions respectively corresponding to the sensor 110 and the sensor 120 are respectively located at both sides of the mobile electronic device 100, as shown in FIG. 2. The processing unit 130 may be a processing hardware (for example, a chip set), a software component, or a combination of a processing hardware and a software component. When the mobile electronic device 100 executes a vibration prompt corresponding to an event, the processing unit 130 determines the user's action according to information provided by the sensors 110 and 120 and timely adjusts the vibration intensity of the vibration prompt accordingly.

Figure 3:
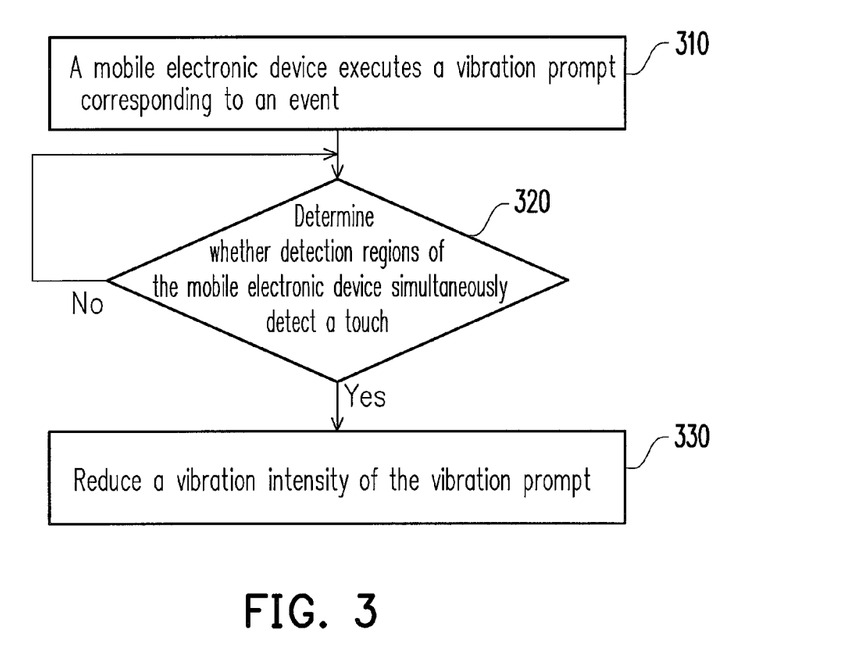
FIG. 3 is a flowchart of a method of adjusting an event prompt degree according to an embodiment of the present application.

Below, the operation of the mobile electronic device 100 will be described in detail. FIG. 3 is a flowchart of a method of adjusting an event prompt degree according to an embodiment of the present application. Referring to both FIG. 1 and FIG. 3, first, when the mobile electronic device 100 receives an event, in step 310, the mobile electronic device 100 executes a vibration prompt corresponding to the event. Herein the event may be an incoming call, a short message, an email, an alarm reminder, a calendar reminder, or any event that can trigger the mobile electronic device 100 to execute a vibration prompt.

Then, in step 320, the processing unit 130 determines whether the detection regions of the mobile electronic device 100 simultaneously detect a touch. That is, the processing unit 130 determines whether all the sensors (for example, the sensors 110 and 120) corresponding to the detection regions simultaneously detect a touch. If so, step 330 is executed. For example, if the sensors 110 and 120 are pressure sensors, the processing unit 130 determines that the sensors 110 and 120 both detect a touch when the pressures detected by the sensors 110 and 120 both exceed a predetermined pressure. According to an embodiment of the present application, in step 320, the processing unit 130 determines whether all the sensors (for example, the sensors 110 and 120) detect a touch from a human body. If so, step 330 is executed. For example, if the sensors 110 and 120 are capacitive sensors, the processing unit 130 determines that the sensors 110 and 120 both detect a touch from a human body when the sensors 110 and 120 both detect a conductor. In addition, if the sensors 110 and 120 are temperature sensors, the processing unit 130 determines that the sensors 110 and 120 both detect a touch from a human body when the temperatures detected by the sensors 110 and 120 both exceed a predetermined temperature. Moreover, if the sensors 110 and 120 are optical sensors, the processing unit 130 determines that the sensors 110 and 120 both detect a touch from a human body when the brightness detected by the sensors 110 and 120 is both lower than a predetermined brightness. Herein how the sensors 110 and 120 detect the touch from the human body is not limited in the present application.

Next, in step 330, the processing unit 130 reduces the vibration intensity of the vibration prompt. For example, the processing unit 130 gradually reduces the vibration intensity of the vibration prompt to the minimum vibration intensity or directly turns off the vibration prompt. In another embodiment of the present application, if in step 310, the mobile electronic device 100 further executes a ringtone prompt corresponding to the event besides the vibration prompt when the mobile electronic device 100 receives the event, in step 330, the processing unit 130 further lowers the volume of the ringtone prompt besides reducing the vibration intensity of the vibration prompt. For example, the processing unit 130 gradually lowers the volume of the ringtone prompt to the minimum volume or directly turns off the ringtone prompt.

Thereby, when the mobile electronic device 100 executes the vibration prompt and/or the ringtone prompt, the mobile electronic device 100 automatically reduces the vibration intensity of a vibration prompt and/or turns off the volume of a ringtone prompt when the user simultaneously touches two (or more) detection regions of the mobile electronic device 100, so that other people won't be bothered by the vibration prompt and/or the ringtone prompt.

Figure 4:
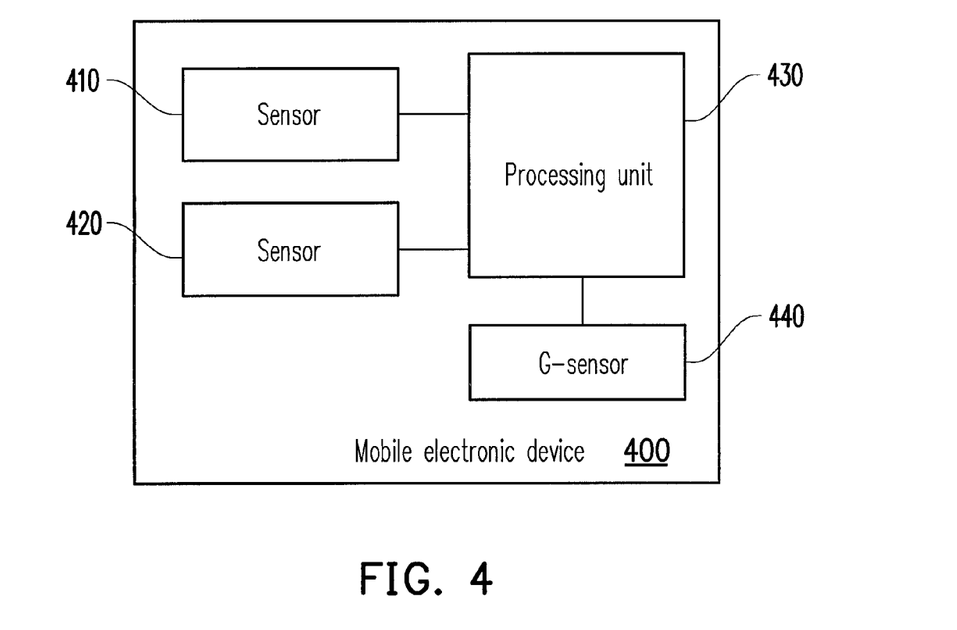
FIG. 4 is a block diagram of a mobile electronic device according to another embodiment of the present application.
Figure 5:
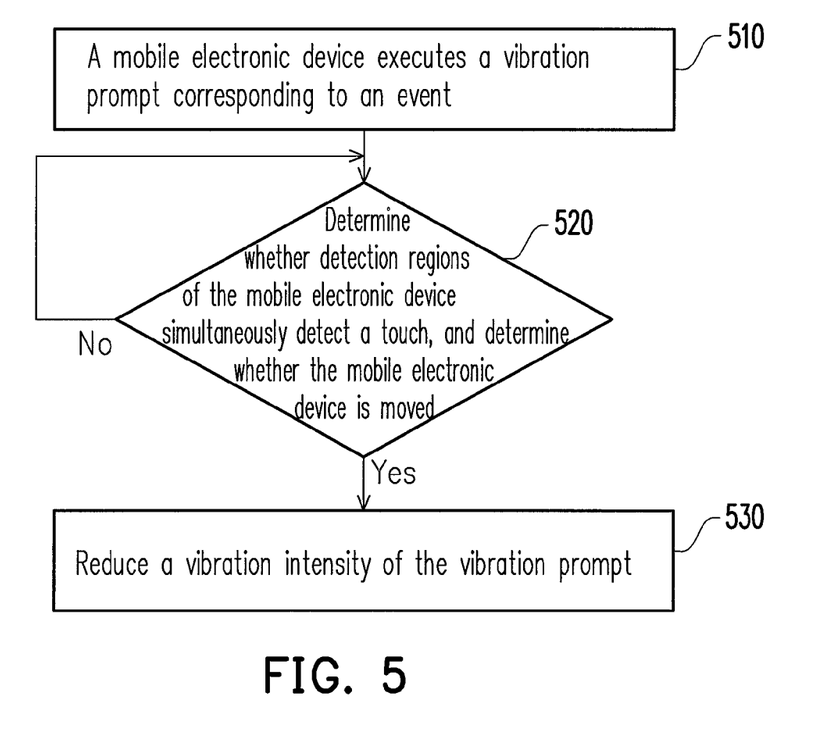
FIG. 5 is a flowchart of a method of adjusting an event prompt degree according to another embodiment of the present application.

FIG. 4 is a block diagram of a mobile electronic device according to another embodiment of the present application, and FIG. 5 is a flowchart of a method of adjusting an event prompt degree according to another embodiment of the present application. The embodiment illustrated in FIG. 4 is a variation of the embodiment illustrated in FIG. 1, and the difference between the two embodiments is that the mobile electronic device 400 further includes a g-sensor 440 besides the sensors 410 and 420 and the processing unit 430. The sensors 410 and 420 and the processing unit 430 in the present embodiment are the same as or similar to the sensors 110 and 120 and the processing unit 130 in the mobile electronic device 100 therefore will not be described herein.

The processing unit 430 obtains acceleration information and/or angle information of the mobile electronic device 400 through the g-sensor 440 and determines whether the mobile electronic device 400 is moved according to such information.

The steps illustrated in FIG. 5 are similar to those illustrated in FIG. 3, and the difference is between the step 520 in FIG. 5 and the step 320 in FIG. 3. In step 520, when the mobile electronic device 400 executes a vibration prompt, besides determining whether the detection regions of the mobile electronic device 400 simultaneously detect a touch (i.e., whether the sensors 410 and 420 respectively corresponding to the detection regions simultaneously detect the touch), the processing unit 430 further determines whether the mobile electronic device 400 is moved according to the information of the mobile electronic device 400 obtained through the g-sensor 440.

For example, the processing unit 430 obtains an initial acceleration of the mobile electronic device 400 when the mobile electronic device 400 just receives the event and a current acceleration of the mobile electronic device 400 through the g-sensor 440 and then calculates the acceleration variation of the mobile electronic device 400. When the acceleration variation is greater than an acceleration threshold, the processing unit 430 determines that the mobile electronic device 400 is moved. Besides, the processing unit 430 may also obtain the initial angle of the mobile electronic device 400 when the mobile electronic device 400 receives the event and the current angle of the mobile electronic device 400 according to the information provided by the g-sensor 440 and calculate an angle variation of the mobile electronic device 400 according to foregoing two angles. The processing unit 430 determines that the mobile electronic device 400 is moved once the angle variation is greater than a angle threshold.

In step 520, if the processing unit 430 determines that the sensor 410 and the sensor 420 respectively corresponding to two detection regions simultaneously detect a touch and the mobile electronic device 400 is moved, step 530 is executed. In step 530, the processing unit 430 reduces the vibration intensity of the vibration prompt. Step 530 is the same as or similar to step 330 therefore will not be described herein.

It should be noted that in step 520, the processing unit 430 first determines whether the sensor 410 and the sensor 420 simultaneously detect the touch and then determines whether the mobile electronic device 400 is moved. In addition, the processing unit 430 may also first determine whether the mobile electronic device 400 is moved and then determine whether the sensor 410 and the sensor 420 simultaneously detect the touch. In other words, the sequence for determining whether the sensor 410 and the sensor 420 simultaneously detect the touch and whether the mobile electronic device 400 is moved is not limited in the present application.

Accordingly, when the mobile electronic device 400 executes the vibration prompt and/or the ringtone prompt, the mobile electronic device 400 automatically reduces the vibration intensity of the vibration prompt and/or lowers the volume of the ringtone prompt if the user simultaneously touches two (or more) detection regions of the mobile electronic device 400 and moves the mobile electronic device 400, so that no continuous vibration prompt or ringtone prompt is produced to bother other people.

Figure 6:
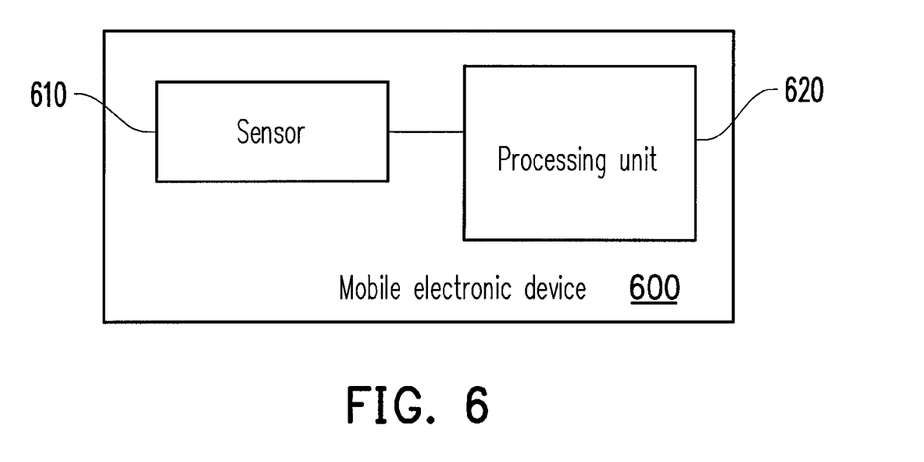
FIG. 6 is a block diagram of a mobile electronic device according to an embodiment of the present application.

FIG. 6 is a block diagram of a mobile electronic device according to an embodiment of the present application. As shown in FIG. 6, the mobile electronic device 600 includes a sensor 610 and a processing unit 620. Herein the mobile electronic device 600 may be a cell phone, a PDA, a PDA phone, a smart phone, a digital camera, a music player, a game device, or any other mobile electronic device which offers an event prompt function. The sensor 610 may be a g-sensor for detecting an inclination angle and an acceleration variation of the mobile electronic device 600. The processing unit 620 is connected to the sensor 610, and which may be a processing hardware (for example, a chip set), a software component, or a combination of a processing hardware and a software component. When the mobile electronic device 600 executes a vibration prompt corresponding to an event, the processing unit 620 determines whether the mobile electronic device 600 is moved according to the information provided by the sensor 610. If the processing unit 620 determines that the mobile electronic device 600 is moved, the processing unit 620 automatically adjusts the degree of the event prompt.

Figure 7:
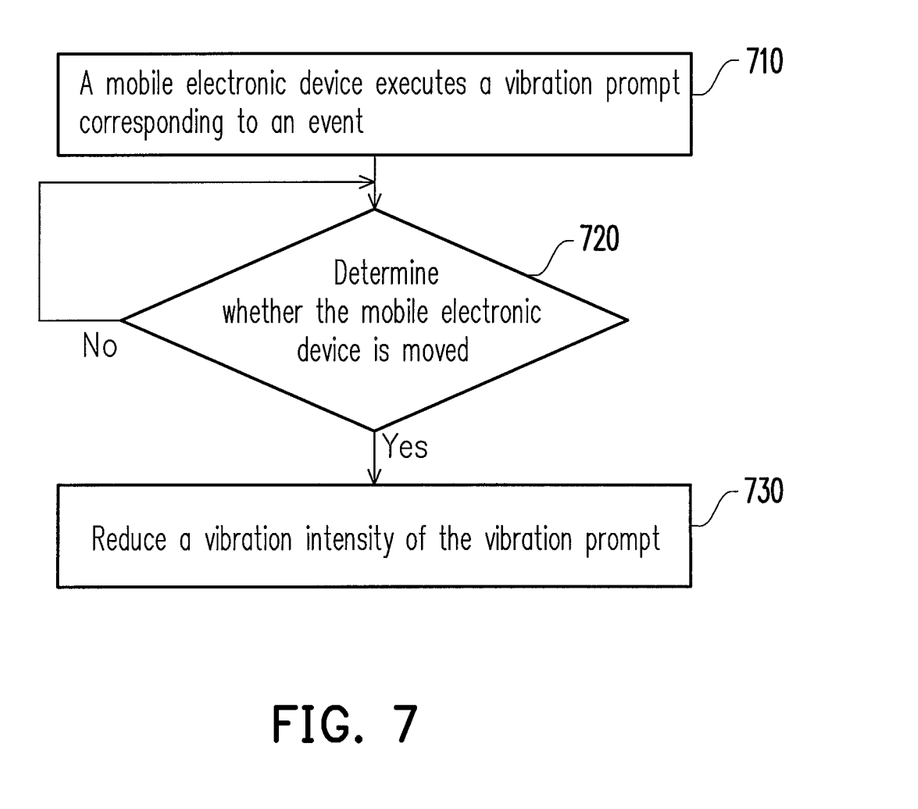
FIG. 7 is a flowchart of a method of adjusting an event prompt degree according to an embodiment of the present application.

Below, the operation of the mobile electronic device 600 will be further described in detail. FIG. 7 is a flowchart of a method of adjusting an event prompt degree according to an embodiment of the present application. Referring to both FIG. 6 and FIG. 7, first, when the mobile electronic device 600 receives an event, in step 710, the mobile electronic device 600 executes a vibration prompt corresponding to the event. Herein the event may be an incoming call, a short message, an email, an alarm reminder, a calendar reminder, or any event that can trigger the mobile electronic device 600 to execute a vibration prompt.

Then, in step 720, the processing unit 620 determines whether the mobile electronic device 600 is moved. Herein the processing unit 620 determines whether the mobile electronic device 600 is moved according to the angle variation and/or the acceleration variation of the mobile electronic device 600 obtained by the sensor 610. This step is the same as or similar to the step in foregoing embodiment therefore will not be described herein.

If the processing unit 620 determines that the mobile electronic device 600 is moved in step 720, step 730 is then executed. In step 730, the processing unit 620 reduces the vibration intensity of the vibration prompt. For example, the processing unit 620 gradually reduces the vibration intensity of the vibration prompt or directly turns off the vibration prompt. If the mobile electronic device 600 executes a ringtone prompt corresponding to the event at the same time, the processing unit 620 also lowers the volume of the ringtone prompt or directly turns off the ringtone prompt.

Figure 8:
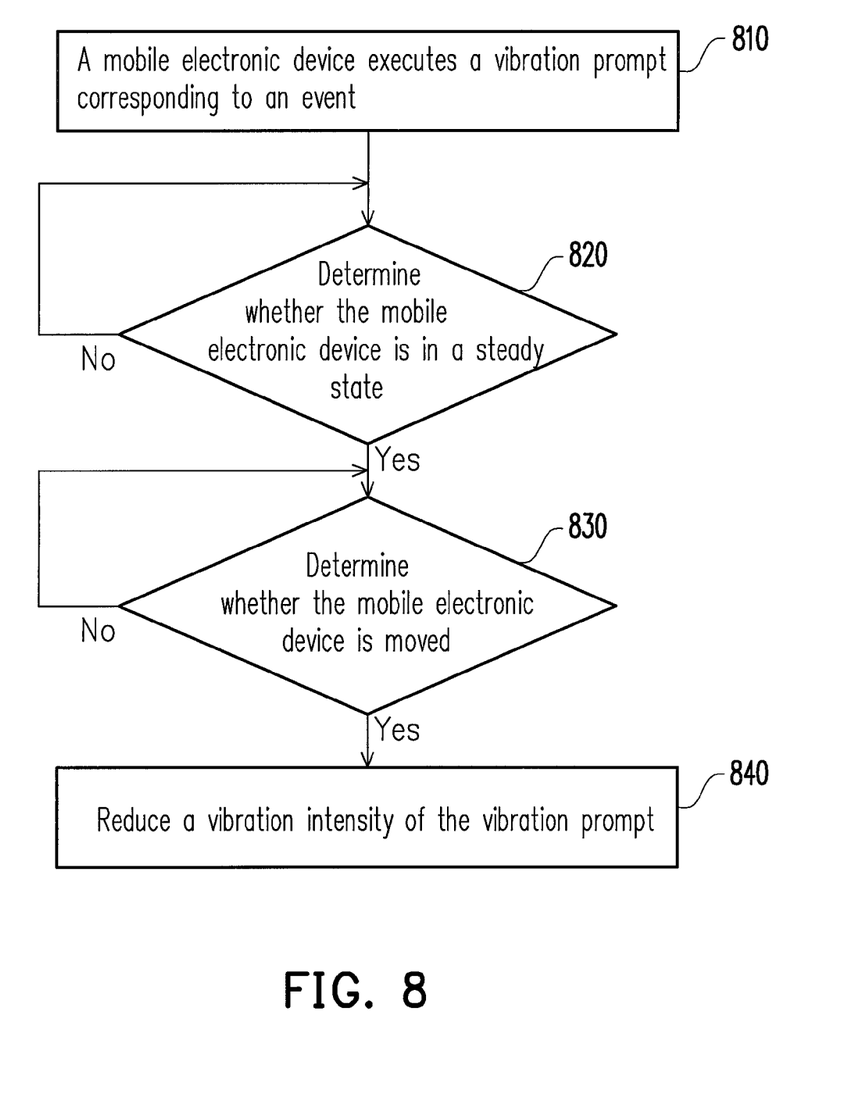
FIG. 8 is a flowchart of a method of adjusting an event prompt degree according to an embodiment of the present application.

FIG. 8 is a flowchart of a method of adjusting an event prompt degree according to another embodiment of the present application. When the mobile electronic device 600 receives an event in this embodiment, the processing unit 620 has to determine whether the mobile electronic device 600 is in a steady state (step 820) before the processing unit 620 determines whether the mobile electronic device 600 is moved (step 830). Referring to both FIG. 6 and FIG. 8, after the mobile electronic device 600 executes a vibration prompt corresponding to a received event (step 810), the processing unit 620 determines whether the mobile electronic device 600 is in the steady state (step 820). For example, the processing unit 620 first obtains an acceleration variation of the mobile electronic device 600 through the sensor 610. In an embodiment, the mobile electronic device 600 is determined to be in the steady state if the acceleration variation remains within a predetermined range for a predetermined period (for example, 0.1 second). Namely, the processing unit 620 determines that the mobile electronic device 600 is in the steady (for example, still) state as long as the acceleration variation of the mobile electronic device 600 remains within the predetermined range for a specific period of time.

In another embodiment, the processing unit 620 obtains the acceleration variation of the mobile electronic device 600 at several times. Among all of the obtained acceleration variations, if the number of acceleration variations exceeding the predetermined range is within an acceptable range (for example, the ratio of the number of the acceleration variations exceeding the predetermined range to the total number of the obtained acceleration variations is smaller than a threshold), the processing unit 620 also determines that the mobile electronic device 600 is in the steady state. For example, if the processing unit 620 obtains the acceleration variation of the mobile electronic device 600 at five different time points and only one of the acceleration variations exceeds the predetermined range, the processing unit 620 still determines that the mobile electronic device 600 is in the steady state. This makes the determination of the steady state more flexible.

The processing unit 620 keeps determining whether the mobile electronic device 600 is in the steady state until it determines that the mobile electronic device 600 is in the steady state. Then, in step 830, the processing unit 620 further determines whether the mobile electronic device 600 is moved. The step of determining whether the mobile electronic device 600 is moved is the same as or similar to the step in foregoing embodiment therefore will not be described herein.

If the processing unit 620 determines that the mobile electronic device 600 is moved, in step 840, the processing unit 620 reduces the vibration intensity of the vibration prompt. For example, the processing unit 620 gradually reduces the vibration intensity of the vibration prompt or directly turns off the vibration prompt. If the event received by the mobile electronic device 600 is corresponding to a ringtone prompt, the processing unit 620 also lowers the volume of the ringtone prompt or directly turns off the ringtone prompt.

Figure 9:
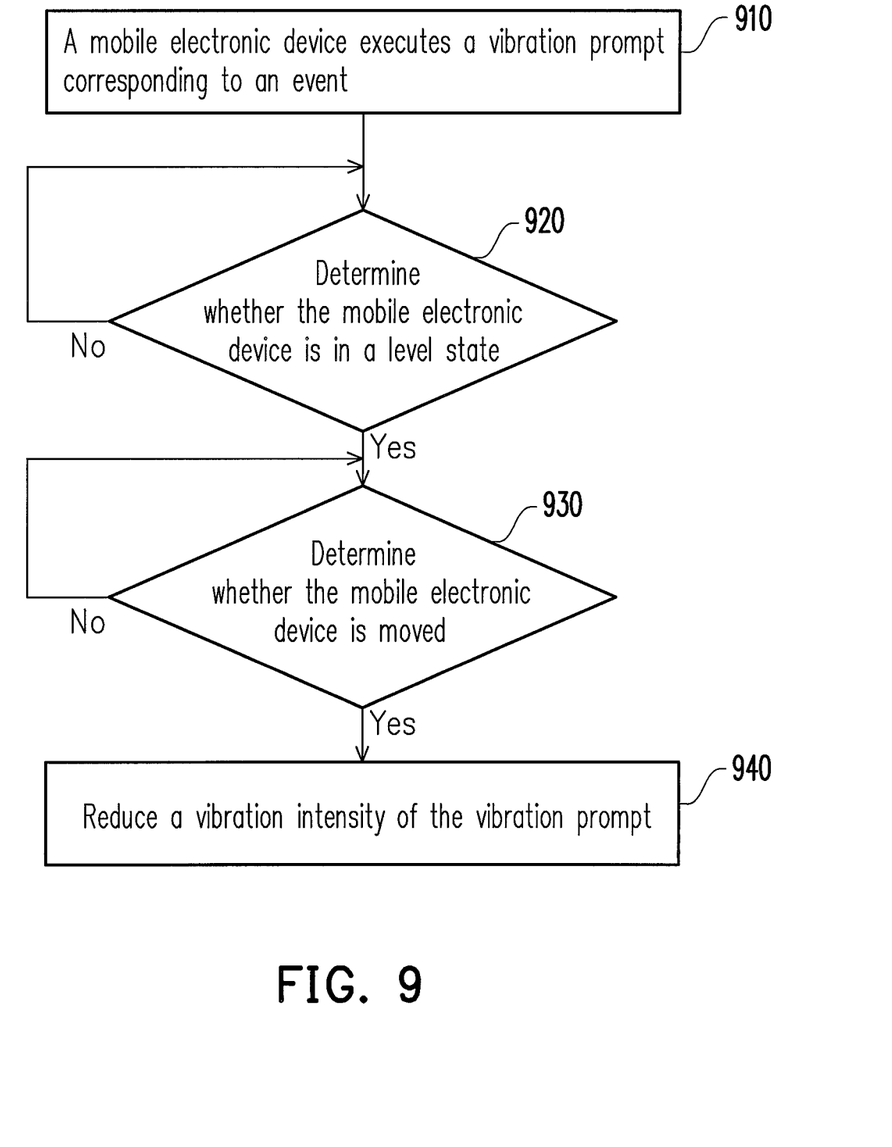
FIG. 9 is a flowchart of a method of adjusting an event prompt degree according to an embodiment of the present application.

FIG. 9 is a flowchart of a method of adjusting an event prompt degree according to another embodiment of the present application. In the present embodiment, the processing unit 620 has to determine whether the mobile electronic device 600 is in a level state when the mobile electronic device 600 receives an event before the processing unit 620 determines whether the mobile electronic device 600 is moved. Referring to both FIG. 6 and FIG. 9, after the mobile electronic device 600 executes a vibration prompt corresponding to an event (step 910), the processing unit 620 determines whether the mobile electronic device 600 is in a level state according to information provided by the sensor 610 (step 920). To be specific, because the sensor 610 can obtain angle information of the mobile electronic device 600 respectively corresponding to the axes X, Y, and Z in the three-dimensional space, the processing unit 620 can obtain the inclination angle of the mobile electronic device 600 through the sensor 610. The processing unit 620 determines that the mobile electronic device 600 is in a level state if the inclination angle is within a predetermined range (for example, 0°-45°).

After the processing unit 620 determines that the mobile electronic device 600 is in the level state, the processing unit 620 further determines whether the mobile electronic device 600 is moved (step 930). Similarly, the processing unit 620 determines whether the mobile electronic device 600 is moved according to the acceleration variation or the angle variation provided by the sensor 610.

If the mobile electronic device 600 is moved, the processing unit 620 reduces the vibration intensity of the vibration prompt (step 940). For example, the processing unit 620 gradually reduces the vibration intensity or directly turns off the vibration prompt. In another embodiment, when the processing unit 620 reduces the vibration intensity of the vibration prompt, the processing unit 620 may further lower the volume of a ringtone prompt corresponding to the event or directly turn off the ringtone prompt.

Figure 10:
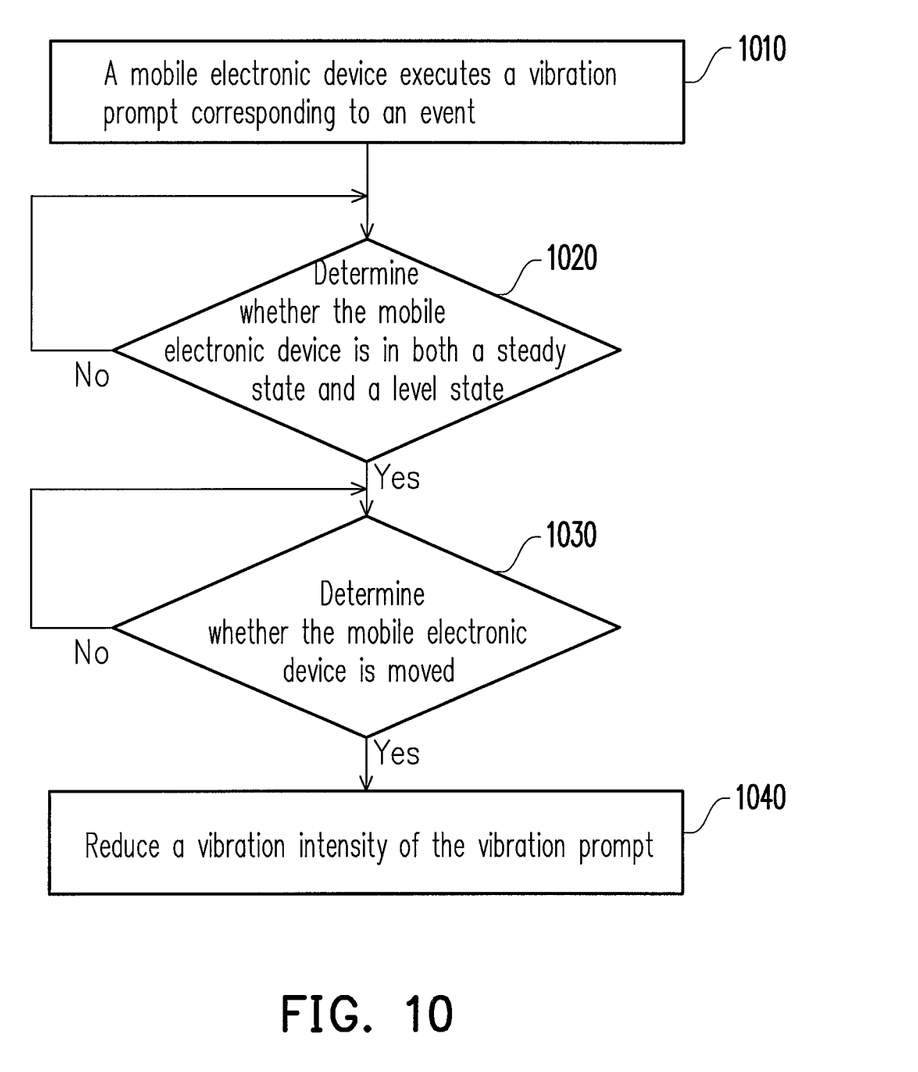
FIG. 10 is a flowchart of a method of adjusting an event prompt degree according to an embodiment of the present application.

FIG. 10 is a flowchart of a method of adjusting an event prompt degree according to yet another embodiment of the present application. In the present embodiment, the processing unit 620 has to determine whether the mobile electronic device 600 is in a steady and level state when the mobile electronic device 600 receives an event before the processing unit 620 determines whether the mobile electronic device 600 is moved. Referring to both FIG. 6 and FIG. 10, after the mobile electronic device 600 executes a vibration prompt corresponding to an event (step 1010), besides determining whether the mobile electronic device 600 is in the steady state, the processing unit 620 further determines whether the mobile electronic device 600 is in a level state (step 1020). In the present embodiment, the processing unit 620 also determines whether the mobile electronic device 600 is in a steady and level state according to the information provided by the sensor 610. This step is the same as or similar to that described in foregoing embodiment therefore will not be described herein.

After determining that the mobile electronic device 600 is in the steady and level state, the processing unit 620 further determines whether the mobile electronic device 600 is moved (step 1030). After determining that the mobile electronic device 600 is moved, the processing unit 620 reduces the vibration intensity of the vibration prompt (step 1040). Besides, the processing unit 620 may also directly turn off the vibration prompt, lower the volume of a ringtone prompt corresponding to the event, or directly turn off the ringtone prompt.

As the described embodiments, before reducing the degree of the event prompt when the mobile electronic device 600 is moved, the processing unit 620 has to determine whether the mobile electronic device 600 is in the steady state, whether the mobile electronic device 600 is in the level state, or whether the mobile electronic device 600 is in the steady and level state, so that such situation that the mobile electronic device 600 is placed in a pocket or bag and carried around by a user is eliminated. Namely, the event prompt degree is only adjusted when the user purposely picks up the mobile electronic device 600. Thereby, it is ensured that the event prompt degree is properly and timely adjusted.

Figure 11:
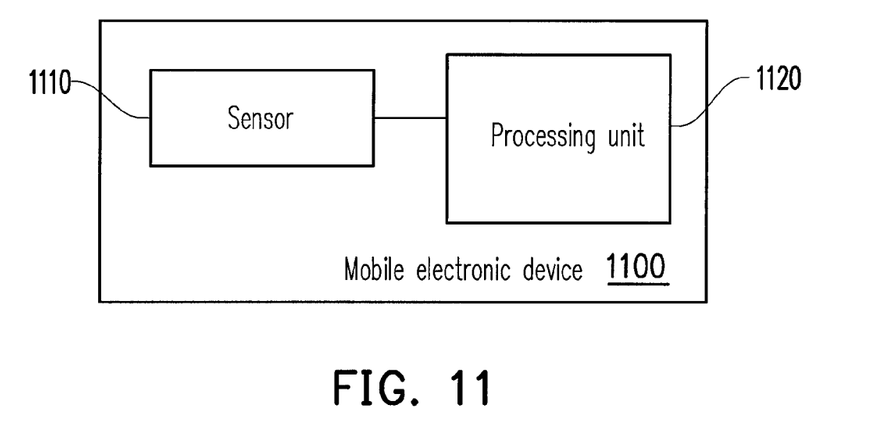
FIG. 11 is a block diagram of a mobile electronic device according to an embodiment of the present application.

FIG. 11 is a block diagram of a mobile electronic device according to an embodiment of the present application. As shown in FIG. 11, the mobile electronic device 1100 includes a sensor 1110 and a processing unit 1120, wherein the sensor 1110 and the processing unit 1120 are connected with each other. Herein the mobile electronic device 1100 may be a cell phone, a PDA, a PDA phone, a smart phone, a digital camera, a music player, a game device, or any other mobile electronic device which offers an event prompt function.

The sensor 1110 may be a g-sensor for detecting an angle variation of the mobile electronic device 1100. The processing unit 1120 may be a processing hardware (for example, a chip set), a software component, or a combination of a processing hardware and a software component. When the mobile electronic device 1100 executes a ringtone prompt corresponding to an event, the processing unit 1120 determines whether a user picks up the mobile electronic device 1100 according to the information provided by the sensor 1110. The processing unit 1120 automatically adjusts the degree of the ringtone prompt if the processing unit 1120 determines that the mobile electronic device 1100 is picked up by the user.

Figure 12:
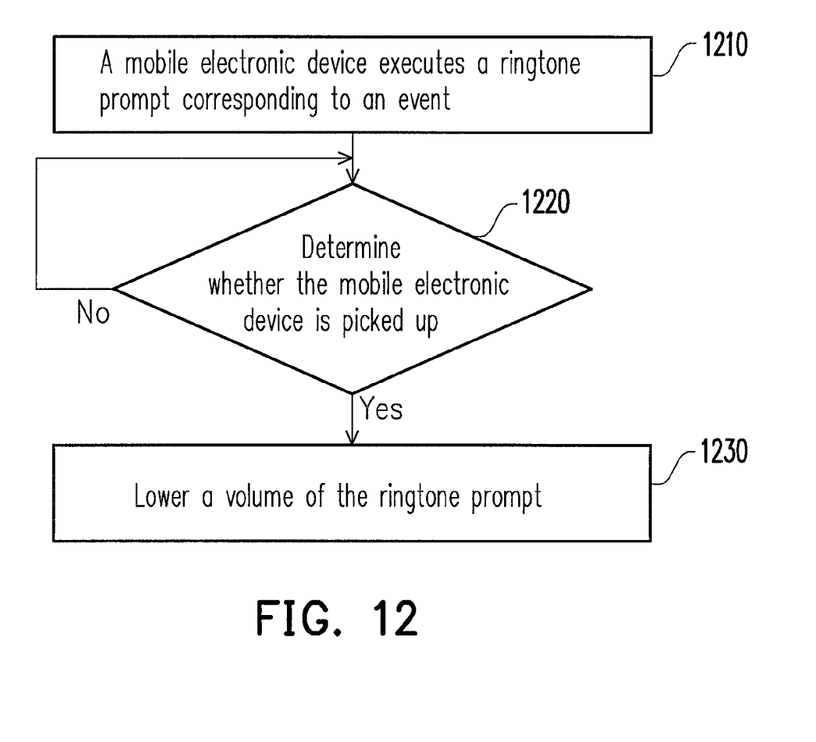
FIG. 12 is a flowchart of a method of adjusting an event prompt degree according to an embodiment of the present application.

Below, the operation of the mobile electronic device 1100 will be described in detail. FIG. 12 is a flowchart of a method of adjusting an event prompt degree according to an embodiment of the present application. Referring to both FIG. 11 and FIG. 12, first, when the mobile electronic device 1100 receives an event, in step 1210, the mobile electronic device 1100 executes a ringtone prompt corresponding to the event. Herein the event may be an incoming call, a short message, an email, an alarm reminder, a calendar reminder, or any event that can trigger the mobile electronic device 1100 to execute a ringtone prompt.

Then, in step 1220, the processing unit 1120 determines whether the mobile electronic device 1100 is picked up. Herein the processing unit 1120 determines whether the mobile electronic device 1100 is picked up according to the angle variation of the mobile electronic device 1100 obtained by the sensor 1110. To be specific, the processing unit 1120 determines that the mobile electronic device 1100 is picked up when the processing unit 1120 determines that the angle variation obtained by the sensor 1110 is greater than an angle threshold.

After the processing unit 1120 determines that the mobile electronic device 1100 is picked up, in step 1230, the processing unit 1120 lowers the volume of the ringtone prompt. In an embodiment, the processing unit 1120 gradually lowers the volume of the ringtone prompt until the ringtone prompt is turned off. In another embodiment, the processing unit 1120 directly turns off the ringtone prompt. Additionally, if the mobile electronic device 1100 also executes a vibration prompt corresponding to the event in step 1210, in step 1230, the processing unit 1120 also gradually reduces the vibration intensity of the vibration prompt or directly turns off the vibration prompt.

The present application further provides a computer program product composed of a plurality of program instructions (for example, setting program instructions or deployment program instructions). After these program instructions are loaded into the mobile electronic device with a processor, the method of adjusting an event prompt degree described above can be executed and the function of the mobile electronic device described in foregoing embodiments can be realized. The computer program product can be stored into any data storage device (for example, a read only memory (ROM), a random access memory (RAM), a magnetic tape, a floppy disc, a CD, or a transmission medium) or directly transmitted through a network. However, how the computer program product is stored is not limited in the present application.

In summary, in an embodiment of the present application, when a mobile electronic device executes a vibration prompt corresponding to an event, whether a user touches and/or picks up the mobile electronic device is determined according to information provided by a sensor, and the degree of the vibration prompt is automatically reduced and the volume of a ringtone prompt corresponding to the event is automatically lowered when the mobile electronic device is touched and/or picked up by the user. Thus, after the user gets to know about a new event through a prompt, the user can quickly and conveniently reduce the degree of the event prompt without having to turn off the event prompt through the menu or a specific button. Thereby, other people won't be bothered by the continuous event prompt.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A method of adjusting an event prompt degree, adaptable to a mobile electronic device, the method comprising:
    determining whether the mobile electronic device is in a steady state when the mobile electronic device executes a vibration prompt and/or a ringtone prompt corresponding to an event;
    after the mobile electronic device is determined to be in the steady state, determining whether at least two detection regions of the mobile electronic device simultaneously detect a touch and whether the mobile electronic device is moved; and
    reducing a vibration intensity of the vibration prompt and/or a volume of the ringtone prompt when the detection regions simultaneously detect the touch and the mobile electronic device is moved.

2. The method according to claim 1, wherein the step of determining whether the mobile electronic device is in the steady state comprises:
- obtaining an acceleration variation of the mobile electronic device; and
- determining that the mobile electronic device is in the steady state when the acceleration variation remains within a predetermined range for a predetermined period.

3. A mobile electronic device, comprising:
- at least two first sensors, wherein each of the first sensors is corresponding to a detection region of the mobile electronic device, and the detection regions respectively corresponding to the first sensors are independent of each other;
- a second sensor; and
- a processing unit, coupled to the first sensors and the second sensor, wherein the processing unit is configured to determine whether the mobile electronic device is in a steady state when the mobile electronic device executes a vibration prompt and/or a ringtone prompt corresponding to an event, to determine whether the first sensors simultaneously detect a touch, and whether the mobile electronic device is moved according to the second sensor after determining that the mobile electronic device is in the steady state, and to reduce a vibration intensity of the vibration prompt and/or a volume of the ringtone prompt when the first sensors simultaneously detect the touch the mobile electronic device is moved.

4. The mobile electronic device according to claim 3, wherein the processing unit obtains an acceleration variation of the mobile electronic device through the second sensor and determines that the mobile electronic device is in the steady state when the acceleration variation remains within a predetermined range for a predetermined period.

5. A computer program product, comprising a plurality of program instructions to be loaded into a mobile electronic device with a processor, and cause the processor to perform the operations of:
- determining whether the mobile electronic device is in a steady state when the mobile electronic device executes a vibration prompt and/or a ringtone prompt corresponding to an event;
- after the mobile electronic device is determined to be in the steady state, determining whether a touch on at least two detection regions of the mobile electronic device is simultaneously detected and whether the mobile electronic device is moved; and
- reducing a vibration intensity of the vibration prompt and/or a volume of the ringtone prompt when the touch on the detection regions is detected and the mobile electronic device is moved.

6. A mobile electronic device, comprising:
- a determination means for determining whether the mobile electronic device is in a steady state when the mobile electronic device executes a vibration prompt and/or a ringtone prompt corresponding to an event, and after the mobile electronic device is determined to be in the steady state, determining whether at least two detection regions of the mobile electronic device simultaneously detect a touch and whether the mobile electronic device is moved; and
- an adjustment means for reducing a vibration intensity of the vibration prompt and/or a volume of the ringtone prompt when the detection regions simultaneously detect the touch and the mobile electronic device is moved.

7. A method of adjusting an event prompt degree, adaptable to a mobile electronic device, the method comprising:
- determining whether the mobile electronic device is in a level state when the mobile electronic device executes a vibration prompt and/or a ringtone prompt corresponding to an event;
- after the mobile electronic device is determined to be in the level state, determining whether at least two detection regions of the mobile electronic device simultaneously detect a touch and whether the mobile electronic device is moved; and
- reducing a vibration intensity of the vibration prompt and/or a volume of the ringtone prompt when the detection regions simultaneously detect the touch and the mobile electronic device is moved.

8. The method according to claim 7, wherein the step of determining whether the mobile electronic device is in the level state comprises:
- obtaining an inclination angle of the mobile electronic device; and
- determining that the mobile electronic device is in the level state when the inclination angle is within a predetermined range.

9. A mobile electronic device, comprising:
- at least two first sensors, wherein each of the first sensors is corresponding to a detection region of the mobile electronic device, and the detection regions respectively corresponding to the first sensors are independent of each other;
- a second sensor; and
- a processing unit, coupled to the first sensors and the second sensor, wherein the processing unit is configured to determine whether the mobile electronic device is in a level state when the mobile electronic device executes a vibration prompt and/or a ringtone prompt corresponding to an event, to determine whether the first sensors simultaneously detect a touch, and whether the mobile electronic device is moved according to the second sensor after determining that the mobile electronic device is in the level state, and to reduce a vibration intensity of the vibration prompt and/or a volume of the ringtone prompt when the first sensors simultaneously detect the touch the mobile electronic device is moved.

10. The mobile electronic device according to claim 9, wherein the processing unit obtains an inclination angle of the mobile electronic device through the second sensor and determines that the mobile electronic device is in the level state when the inclination angle is within a predetermined range.

11. A computer program product, comprising a plurality of program instructions to be loaded into a mobile electronic device with a processor, and cause the processor to perform the operations of:
- determining whether the mobile electronic device is in a level state when the mobile electronic device executes a vibration prompt and/or a ringtone prompt corresponding to an event;
- after the mobile electronic device is determined to be in the level state, determining whether at least two detection regions of the mobile electronic device simultaneously detect a touch and whether the mobile electronic device is moved; and
- reducing a vibration intensity of the vibration prompt and/or a volume of the ringtone prompt when the detection regions simultaneously detect the touch and the mobile electronic device is moved.

12. A mobile electronic device, comprising:

a determination means for determining whether the mobile electronic device is in a level state when the mobile electronic device executes a vibration prompt and/or a ringtone prompt corresponding to an event, and after the mobile electronic device is determined to be in the level state, determining whether at least two detection regions of the mobile electronic device simultaneously detect a touch and whether the mobile electronic device is moved; and an adjustment means for reducing a vibration intensity of the vibration prompt and/or a volume of the ringtone prompt when the detection regions simultaneously detect the touch and the mobile electronic device is moved.

* * * * *